United States Patent
Pritchard et al.

(10) Patent No.: US 8,589,729 B1
(45) Date of Patent: Nov. 19, 2013

(54) DATA PRESERVATION SYSTEM AND METHOD

(75) Inventors: Jason Pritchard, Hopkinton, MA (US); Himanshu Agrawal, Cambridge, MA (US); Michael Robillard, Shrewsbury, MA (US); Robert Beauchamp, Milford, MA (US)

(73) Assignee: EMC Corporation, Hopkinton, MA (US)

( * ) Notice: Subject to any disclaimer, the term of this patent is extended or adjusted under 35 U.S.C. 154(b) by 641 days.

(21) Appl. No.: 11/864,094

(22) Filed: Sep. 28, 2007

(51) Int. Cl.
*G06F 11/00* (2006.01)

(52) U.S. Cl.
USPC .......................................................... 714/14

(58) Field of Classification Search
USPC ....................................... 714/14, 22
See application file for complete search history.

(56) References Cited

U.S. PATENT DOCUMENTS

| | | | | |
|---|---|---|---|---|
| 5,519,831 A * | 5/1996 | Holzhammer | ................... | 714/22 |
| 5,586,291 A * | 12/1996 | Lasker et al. | ................. | 711/113 |
| 5,982,655 A * | 11/1999 | Doyle | .............................. | 365/63 |
| 6,239,578 B1 * | 5/2001 | Schnell et al. | ................ | 320/119 |
| 6,243,795 B1 * | 6/2001 | Yang et al. | ..................... | 711/159 |
| 6,336,174 B1 * | 1/2002 | Li et al. | .......................... | 711/162 |
| 8,018,729 B2 * | 9/2011 | Skinner | ....................... | 361/760 |
| 2002/0080541 A1 * | 6/2002 | Bunker et al. | ................... | 361/72 |
| 2004/0030850 A1 * | 2/2004 | Plappert | ......................... | 711/159 |
| 2004/0190210 A1 * | 9/2004 | Leete | .............................. | 361/90 |
| 2005/0253259 A1 * | 11/2005 | Lin et al. | ....................... | 257/734 |
| 2006/0069870 A1 * | 3/2006 | Nicholson et al. | ............. | 711/118 |
| 2006/0184736 A1 * | 8/2006 | Benhase et al. | ............... | 711/118 |
| 2006/0277422 A1 * | 12/2006 | Berke et al. | ..................... | 713/300 |
| 2008/0082766 A1 * | 4/2008 | Okin et al. | ..................... | 711/154 |
| 2008/0101051 A1 * | 5/2008 | Middleton et al. | ............. | 361/796 |

OTHER PUBLICATIONS

"Microsoft Computer Dictionary", 2002, Microsoft Press, 5th ed., pp. 223.*

* cited by examiner

*Primary Examiner* — Christopher McCarthy
(74) *Attorney, Agent, or Firm* — Brian J. Colandreo; Mark H. Whittenberger; Holland & Knight LLP

(57) ABSTRACT

A data preservation device includes a circuit board configured to be positioned within a memory module slot of a computing device and releasably engage a memory bus of the computing device. A non-volatile memory storage device is electrically coupled to the circuit board. A control circuit is electrically coupled to the circuit board and is configured to read a data portion from the computing device and write the data portion to the non-volatile memory storage device during the occurrence of a power failure event on the computing device. An independent power supply is configured to power the data preservation device during the power failure event.

20 Claims, 4 Drawing Sheets

DATA PRESERVATION SYSTEM AND METHOD

TECHNICAL FIELD

This disclosure relates to data preservation devices and, more particularly, to internal data preservation devices.

BACKGROUND

Various systems and methodologies have been utilized to protect data in the event of power failures. For example, uninterruptible power supplies may be employed to provide power to computing devices during such power failures.

Uninterruptible power supplies may be external or may be incorporated into the power supply of a computer system, thus eliminating the need for an external uninterruptible power supply. Unfortunately, such uninterruptible power supplies are often quite large and, therefore, require considerable space whether inside or outside of the computing device. Further, such space requirements often complicate things further when using rack-mounted computing devices.

In an effort to eliminate the need for such cumbersome devices, smaller versions of uninterruptible power supplies have been incorporated into system (i.e. mother) boards of computing devices. Unfortunately, such board-mounted uninterruptible power supplies required the use of custom system boards. Accordingly, the cost of manufacturing systems that incorporate such a board-mounted uninterruptible power supply is higher (when compared to systems that use standard system boards. Further, due to the need for a custom system board, the ability to retrofit existing computing devices with a board-mounted uninterruptible power supply was impossible, absent replacing the system board.

SUMMARY OF DISCLOSURE

In a first implementation, a data preservation device includes a circuit board configured to be positioned within a memory module slot of a computing device and releasably engage a memory bus of the computing device. A non-volatile memory storage device is electrically coupled to the circuit board. A control circuit is electrically coupled to the circuit board and is configured to read a data portion from the computing device and write the data portion to the non-volatile memory storage device during the occurrence of a power failure event on the computing device. An independent power supply is configured to power the data preservation device during the power failure event.

One or more of the following features may be included. The non-volatile memory storage device may be chosen from the group consisting of: an electrically-erasable programmable read-only memory (EEPROM); and an erasable programmable read-only memory (EPROM). The independent power supply may include one or more batteries.

The control circuit may be further configured to read the data portion from the non-volatile memory storage device and write the data portion to the computing device during the occurrence of a power restore event on the computing device.

The computing device may include one or more in-line memory modules. The control circuit may be configured to read the data portion from the one or more in-line memory modules of the computing device. The one or more in-line memory modules may include one or more dual in-line memory modules.

The data preservation device may adhere to one or more memory module standards promulgated by the JEDEC Solid State Technology Association. The control circuit may include a field programmable gate array (FPGA).

In another implementation, a computer program product resides on a computer readable medium that has a plurality of instructions stored on it. When executed by a processor, the instructions cause the processor to perform operations including receiving an indication of a power failure event on a computing device. A data portion is read from the computing device. The data portion is written to a non-volatile memory storage device included within a data preservation device. The data preservation device is configured to be positioned within a memory module slot of the computing device and releasably engage a memory bus of the computing device.

One or more of the following features may be included. The non-volatile memory storage device may be chosen from the group consisting of: an electrically-erasable programmable read-only memory (EEPROM); and an erasable programmable read-only memory (EPROM). An indication of a power restore event on the computing device may be received. The data portion may be read from the non-volatile memory storage device. The data portion may be written to the computing device.

The computing device may include one or more in-line memory modules. Reading a data portion from the computing device may include reading the data portion from the one or more in-line memory modules of the computing device. The one or more in-line memory modules may include one or more dual in-line memory modules. The data preservation device may adhere to one or more memory module standards promulgated by the JEDEC Solid State Technology Association.

In another implementation, a method includes receiving an indication of a power failure event on a computing device. A data portion is read from the computing device. The data portion is written to a non-volatile memory storage device included within a data preservation device. The data preservation device is configured to be positioned within a memory module slot of the computing device and releasably engage a memory bus of the computing device.

One or more of the following features may be included. The non-volatile memory storage device may be chosen from the group consisting of: an electrically-erasable programmable read-only memory (EEPROM); and an erasable programmable read-only memory (EPROM). An indication of a power restore event on the computing device may be received. The data portion may be read from the non-volatile memory storage device. The data portion may be written to the computing device.

The computing device may include one or more in-line memory modules. Reading a data portion from the computing device may include reading the data portion from the one or more in-line memory modules of the computing device. The one or more in-line memory modules may include one or more dual in-line memory modules. The data preservation device may adhere to one or more memory module standards promulgated by the JEDEC Solid State Technology Association.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
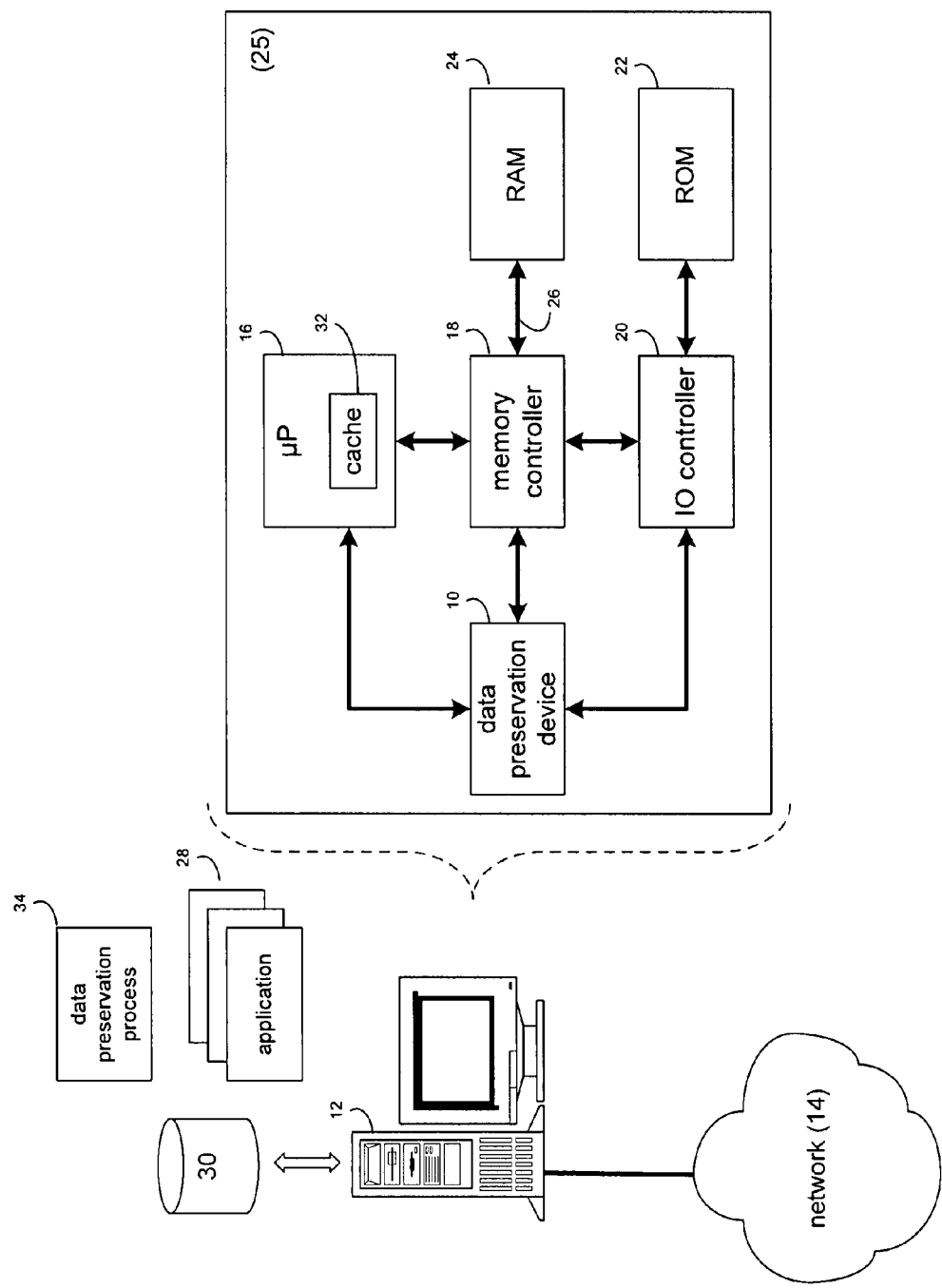
FIG. 1 is a diagrammatic view of a computing device including a data preservation device.

Referring to FIG. 1, there is shown data preservation device 10 that may reside in computing device 12. As will be discussed below in greater detail, data preservation device 10 may, upon receiving an indication of a power failure event on computing device 12, read a portion of data from computing device 12 and may write the portion of data to a non-volatile memory storage device included within data preservation device 10, thus reducing power-failure-related data loss on computing device 12.

Examples of computing device 12 may include, but are not limited to: a personal computer, a server computer, a series of server computers, a mini computer, and a mainframe computer. Computing device 12 may be a web server (or a series of servers) executing an operating system, examples of which may include but are not limited to: Microsoft Windows XP Server™; Novell Netware™; or Redhat Linux™, for example.

Computing device 12 may execute a web server application, examples of which may include but are not limited to: Microsoft IIS™, Novell Webserver™, or Apache Webserver™, that allows for HTTP (i.e., HyperText Transfer Protocol) access to server computer 12 via network 14, examples of which may include but are not limited to: a local area network; a wide area network; or an intranet, for example.

Computing device 12 may include various components, examples of which may include but are not limited to microprocessor 16, memory controller 18, I/O controller 20, non-volatile memory (e.g. ROM) 22, volatile memory (e.g. RAM) 24, and system board 25.

Microprocessor 16 may execute one or more applications, interpret computer instructions, and process data on computing device 12. An example of microprocessor 16 may include but is not limited to an Intel Xenon™ microprocessor offered by The Intel Corporation of Santa Clara, Calif.

Memory controller 18 may allow communication between microprocessor 16 and RAM 24 (via memory bus 26). An example of memory controller 18 may include but is not limited to the Northbridge™ chipset offer by The Intel Corporation of Santa Clara Calif. In addition to volatile memory 24, memory controller 18 may manage communication between microprocessor 16 and accelerated graphics ports (not shown), PCI express cards (not shown), and I/O controller 20.

I/O controller 20 may allow communication between microprocessor 16 and various "slower" devices included within computing device 12. An example of I/O controller 20 may include but is not limited to the Southbridge™ chipset offer by The Intel Corporation of Santa Clara, Calif. Examples of such "slower" devices may include but are not limited to nonvolatile memory 22, a PCI bus (not shown), a real-time clock (not shown), and USB devices (not shown).

Figure 2:
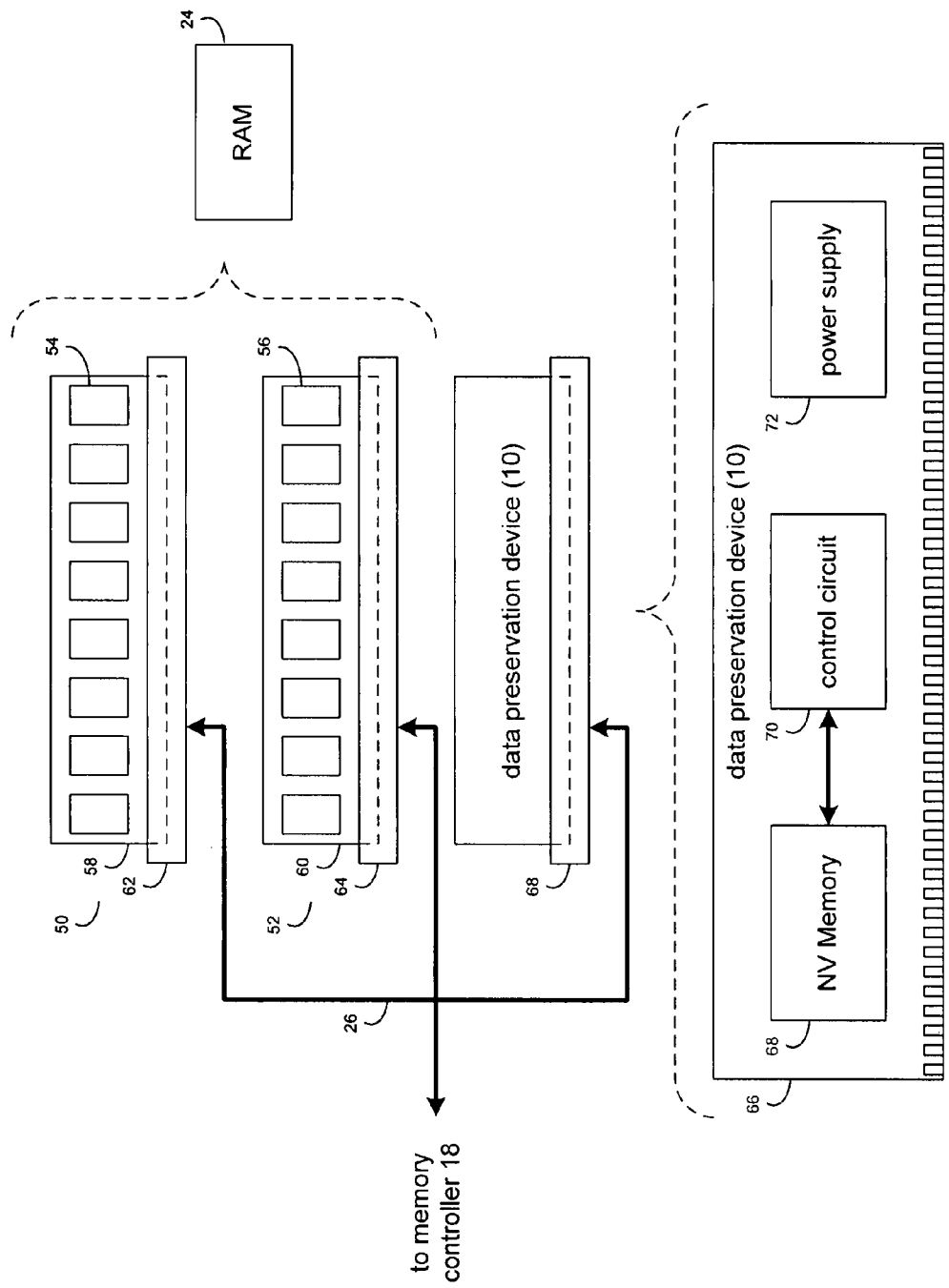
FIG. 2 is a diagrammatic view of the data preservation device of FIG. 1.

Referring also to FIG. 2 and as discussed above, computing device 12 may include volatile memory 24. Volatile memory 24 may include one or more in-line memory modules 50, 52. Examples of in-line memory modules 50, 52 may include but are not limited to dual in-line memory modules (DIMMs). In-line memory modules 50, 52 may include a plurality of random access memory integrated circuits, such as integrated circuits 54, 56 (respectively). In-line memory modules 50, 52 may include a printed circuit board 58, 60 (respectively). Printed circuit boards 58, 60 may be configured to releasably engage memory module slots 62, 64 (respectively), thus releasably coupling in-line memory modules 50, 52 to memory controller 18 (via memory bus 26).

System board 25 may be configured to be Suspend-to-RAM (STR) compatible, in that the various voltage planes (not shown) within system board 25 are designed such that e.g., microprocessor 16, memory controller 18, and I/O controller 20, are powerable to enable entry into STR mode. Further, microprocessor 16, memory controller 18, and I/O controller 20 may also be configured to be STR compatible.

Data preservation device 10 may include circuit board 66 configured to be positioned within memory module slot 68 of computing device 12 and releasably engage e.g., memory bus 26 of computing device 12. Accordingly, data preservation device 10 may be releasably coupled to memory controller 18 via memory bus 26.

Data preservation device 10 may include non-volatile memory storage device 68 that may be electrically coupled to circuit board 66. Examples of non-volatile memory storage device 68 may include but are not limited to electrically-erasable programmable read-only memory (EEPROM) and erasable programmable read-only memory (EPROM).

As will be discussed below in greater detail, control circuit 70 included within data preservation device 10 may be electrically coupled to circuit board 66 and may be configured to read a portion of data from computing device 12 and write the portion of data to non-volatile memory storage device 68 during the occurrence of a power failure event on computing device 12. Control circuit 70 may include a memory controller (not shown) for allowing access to nonvolatile memory storage device 68.

As will also be discussed below in greater detail, control circuit 70 may be further configured to read the portion of data from non-volatile memory storage device 68 and write the portion of data to computing device 12 during the occurrence of a power restore event on computing device 12. Control circuit 70 may include one or more field programmable gate arrays (FPGA), examples of which may include but are not limited to a Virtex class FPGA manufactured by Xilinx of San Jose, Calif.

Independent power supply 72, included within data preservation device 10, may be configured to power data preservation device 10 during the power failure event. Independent power supply 72 may include one or more batteries (not shown), examples of which may include one or more lithium ion batteries, such as those manufactured by LiON Battery of Sanyo, Japan.

Data preservation device 10 may adhere to one or more memory module standards promulgated by e.g., the JEDEC Solid State Technology Association (www.JEDEC.org) of Arlington, Va. Accordingly, data preservation device 10 may appear to be a standard in-line memory module to computing device 12. Further, as data preservation device 10 may adhere to one or more memory module standards, data preservation device 10 may not adversely impact (e.g., through inductive and/or capacitive loading) the quality/integrity of the signals transmitted via memory bus 26.

Computing device 12 may execute one or more applications 28. Examples of applications 28 may include but are not limited to database applications, file management applications, and web server applications.

The instruction sets and subroutines of applications 28, which may be stored on disk drive 30 coupled to computing device 12, may be executed by one or more processors (e.g., microprocessor 16) and one or more memory architectures (e.g., volatile memory 24) incorporated into computing device 12.

While executing one or more of applications 28, data may be processed (e.g., generated, manipulated and/or deleted). As is known in the art, when processing data, the data being processed may be temporarily or permanently stored on various storage devices. Examples of such storage devices may include but are not limited to nonvolatile memory 22, volatile memory 24, disk drive 30 (i.e., a nonvolatile storage device), and cache memory 32 (i.e., a volatile storage device).

Examples of disk drive 30 may include but are not limited to a hard disk drive, an optical drive, a raid array, a secure digital (SD) storage device, and a Compact Flash (CF) storage device. Examples of cache memory 32 may include but are not limited to cache memory included within microprocessor 16 and cache memory external to microprocessor 16.

Figure 3:
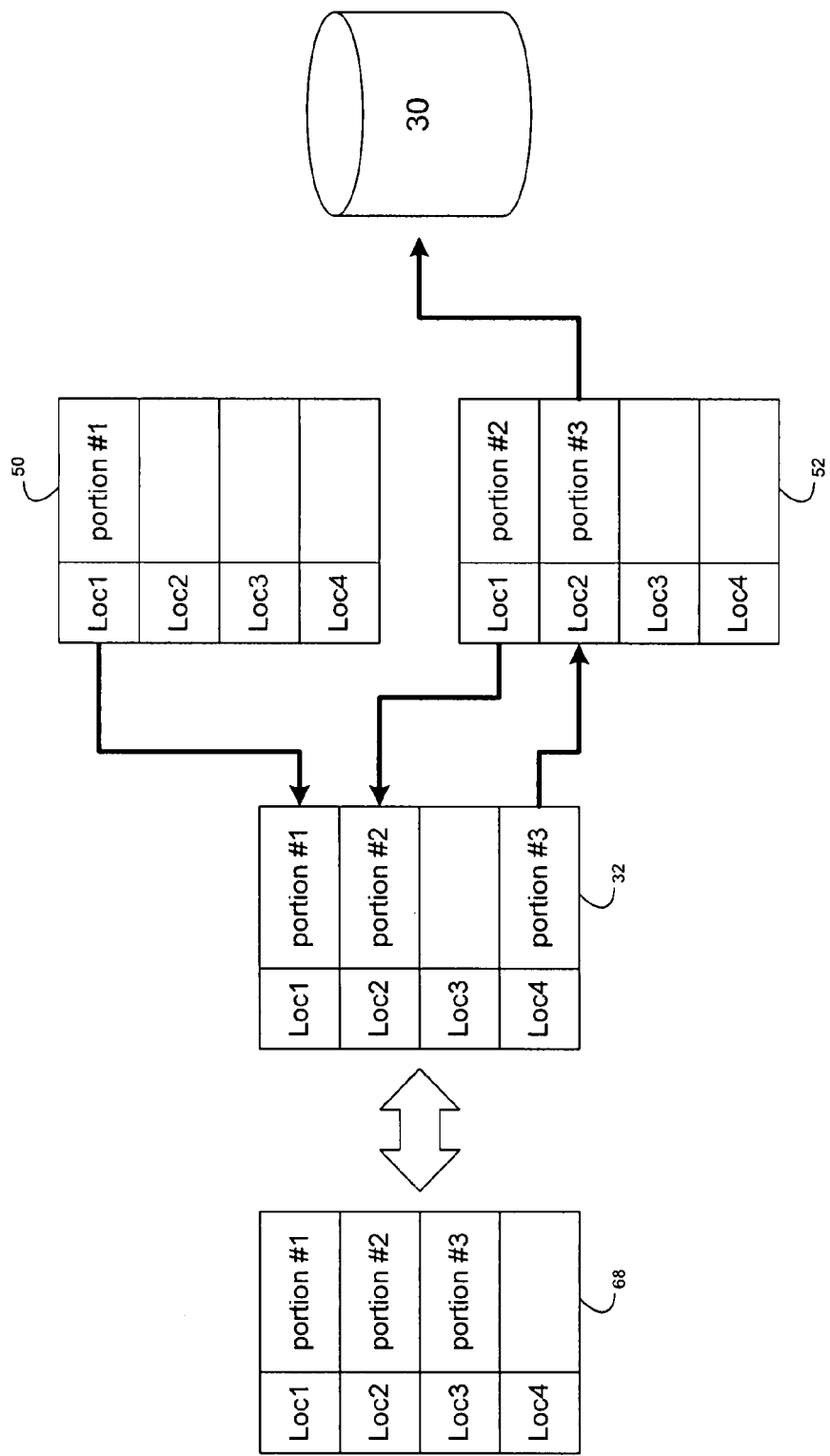
FIG. 3 is a diagrammatic view of illustrative memory locations included within various in-line memory modules and the data preservation device of FIG. 1.

For example and referring also to FIG. 3, when executing one or more applications 28, "data portion #1" may be moved from in-line memory module 50 to cache memory 32. Further, "data portion #2" may be moved from in-line memory module 52 to cache memory 32. Microprocessor 16 may process "data portion #1" and "data portion #2" to generate "data portion #3". "Data portion #3" may be provided to in-line memory module 52 and then provided to disk drive 30.

As discussed above, cache memory 32 and in-line memory modules 50, 52 are volatile memory. Accordingly, in the event of a power failure and continuing with the above-stated example, the copies of "data portion #1", "data portion #2" and "data portion #3" stored on cache memory 32 and in-line memory modules 50, 52 would be lost.

Figure 4:
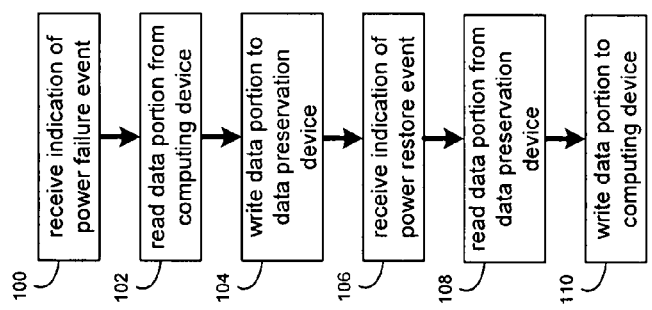
FIG. 4 is a flowchart of a process executed by the data preservation device of FIG. 1.

Referring also to FIG. 4, upon data preservation device 10 receiving 100 an indication of a power failure event on computing device 12, data preservation device 10 may read 102 a data portion from computing device 12.

For example, control circuit 70 of data preservation device 10 may monitor the voltage levels within one or more buses of computing device 12. For illustrative purposes, assume the data preservation device 10 monitors the voltage present on memory bus 26. In the event that the voltage present on memory bus 26 drops below a pre-defined threshold (e.g. 80% of an expected value), control circuit 70 may energize power supply 72. For example, control circuit 70 may be configured to charge power supply 72 during normal operation (i.e. during non-power failure events) of computing device 12. However, upon receiving 100 an indication of a power failure event on computing device 12, control circuit 70 of data preservation device 10 may energize power supply 72 so that power supply 72 may provide electrical energy to one or more components of computing device 12. For example, power supply 72 may be configured to provide a 12 VDC signal to e.g., the voltage planes (not shown) within system board 25 during the power failure event.

For illustrative purposes, assume that data preservation device 10 is configured to provide electrical power to microprocessor 16, memory controller 18, IO controller 20, cache 32, and/or in-line memory modules 50, 52 during such a power failure event. The batteries (not shown) included within power supply 72 may be sized to provide electrical energy to the above-stated components for a defined period of time. An example of such a defined period of time may include but is not limited to one-hundred-twenty seconds.

Accordingly, during a power failure event, power supply 72 of data preservation device 10 may allow e.g. microprocessor 16, memory controller 18, IO controller 20, cache 32 and/or in-line memory modules 50, 52 to continue to operate for the above-described defined period of time.

As discussed above, upon data preservation device 10 receiving 100 an indication of a power failure event on computing device 12, data preservation device 10 may read 102 a data portion from computing device 12. The data portions read 102 by data preservation device 10 may include the data stored within the various volatile memory devices. As discussed above, cache memory 32 and in-line memory modules 50, 52 (which are representative of volatile memory 24) are volatile memory devices and, therefore, if cache memory 32 and in-line memory modules 50, 52 lose power (such as during a power failure event), the data stored within cache memory 32 and in-line memory modules 50, 52 would be lost.

Accordingly, upon receiving 100 an indication of a power failure event on computing device 12, data preservation device 10 may read 102 (via memory controller 18) the data currently being stored in the various volatile memory devices. Once read 102, this data may be written 104 to nonvolatile memory storage device 68 included within data preservation device 10. Additionally/alternatively, the process of storing the content of cache memory 32 may include the intermediate step of copying the content of cache memory 32 to one or more of e.g. in-line memory modules 50, 52. In the event that such an intermediate step is taken, by reading 102 and storing 104 the data included within in-line memory modules 50, 52, the content of cache memory 32 may also be stored within nonvolatile memory storage device 68, provided the content of cache memory 32 was written to one or more of in-line memory modules 50, 52 prior to reading 102 the content of in-line memory modules 50, 52.

As discussed above, computing device 12 may execute an operating system, examples of which may include but are not limited to: Microsoft Windows XP Server™; Novell Netware™; or Redhat Linux™, for example. A data preservation process 34 may be executed on computing device 12. Data preservation process 34 may be e.g. incorporated into the above-described operating system, an applet running within the above-described operating system, or a low-level application.

The instruction sets and subroutines of data preservation process 34, which may be stored on disk drive 30 coupled to computing device 12, may be executed by one or more processors (e.g., microprocessor 16) and one or more memory architectures (e.g., volatile memory 24) incorporated into computing device 12.

Data preservation process 34 may monitor computing device 12 for the occurrence of a power failure event. If such a power failure event is detected, data preservation process 34 may have the content of cache memory 32 copied to one or more of in-line memory modules 50, 52 (i.e. volatile memory 24).

Once the content of e.g., in-line memory modules 50, 52 (and cache memory 32, if needed) are read 102 and written 104 to nonvolatile memory storage device 68 included within data preservation device 10, data preservation device 10 may set an indicator (not shown) included within data preservation device 10 to indicate that e.g. a power failure event has occurred and that data preservation device 10 has stored data within nonvolatile memory storage device 68. An example of such an indicator may include but is not limited to a status bit included within a memory register (not shown) included within e.g. control circuit 70.

When storing the various pieces of data within nonvolatile memory storage device 68, pointers may be used to indicate the location(s) from which the stored data was read so that (during the occurrence of a power restore event) the data may be copied to the appropriate location(s) in volatile memory (e.g. in-line memory modules 50, 52). For example, assume that at the time of the power failure event "data portion #1" was stored within location #1 (i.e. Loc1) of in-line memory module 50; "data portion #2" was stored within location #1 (i.e. Loc1) of in-line memory module 52; and "data portion #3" was stored within location #4 (i.e., Loc4) of cache memory 32. Further, assume that once the power failure event was detected by e.g. data preservation process 34 (and/or data preservation device 10), microprocessor 16 was instructed to copy the content of location #4 (i.e. Loc4) of cache memory 32 to location #2 (i.e., Loc2) of in-line memory module 52.

Data preservation device 10 may then: read 102 "data portion #1" from location #1 (i.e. Loc1) of in-line memory module 50 and write 104 "data portion #1" to location #1 (i.e., Loc1) of nonvolatile memory storage device 68; read 102 "data portion #2" from location #1 (i.e. Loc1) of in-line memory module 52 and write 104 "data portion #2" to location #2 (i.e., Loc2) of nonvolatile memory storage device 68; and read 102 "data portion #3" from location #2 (i.e. Loc2) of in-line memory module 52 and write 104 "data portion #3" to location #3 (i.e., Loc3) of nonvolatile memory storage device 68.

A memory map may be defined by data preservation device 10 as follows:

| Data Portion Name | Current Location | Original Location |
| --- | --- | --- |
| Data Portion #1 | Loc1 of Device 68 | Loc1 of Device 50 |
| Data Portion #2 | Loc2 of Device 68 | Loc1 of Device 52 |
| Data Portion #3 | Loc3 of Device 68 | Loc2 of Device 52 |

The above-defined memory map may also be stored within nonvolatile memory storage device 68 of data preservation device 10 to allow data preservation device 10 to copy the various data portions stored within nonvolatile memory storage device 68 to the proper locations within volatile memory 24 once a power restore event is detected. Once these operations (e.g., the reading 102 of data portions, the writing 104 of data portions, and the storing of the above-defined memory map) are complete, data preservation device 10 may power down or (alternatively) power supply 72 may be allowed to run down, achieving the same result.

Once the power failure event is over and power is restored, the power restore event may be detected by data preservation process 34. As discussed above, data preservation process 34 may be e.g. incorporated into the above-described operating system, an applet running within the above-described operating system, or a low-level application. Accordingly, whenever the above-described operating system reboots, a power restore event may be occurring.

As discussed above, whenever a power failure event has occurred, data preservation device 10 may set an indicator (not shown) included within data preservation device 10 to indicate that e.g. a power failure event has occurred and that data preservation device 10 has stored data within nonvolatile memory storage device 68.

Accordingly, upon data preservation process 34 determining that a power restore event may be occurring (e.g., the above-described operating system is rebooting), data preservation process 34 may provide data preservation device 10 with an indication of the possibility of the occurrence of a power restore event. Upon receiving 106 such an indication, data preservation device 10 may determine the status of the above-described status bit to determine if a power restore event is occurring. If a power restore event is occurring, data preservation device 10 may read 108 the various data portions stored within nonvolatile memory storage device 68 and may write 110 the various data portions to the appropriate locations within volatile memory 24.

Continuing with the above stated example, upon determining that the above-described status bit was indeed set (thus indicating the previous occurrence of a power failure event), control circuit 70 within data preservation device 10 may process the above-described memory map (stored within nonvolatile memory storage device 68) so that the various data portions stored within nonvolatile memory storage device 68 may be read 108 and written 110 to their proper locations within volatile memory 24. As discussed above, control circuit 70 may include a memory controller (not shown) for allowing access to nonvolatile memory storage device 68.

Accordingly, data preservation device 10 may utilize the above-described memory map to: read 108 "Data Portion #1" from location #1 (i.e., Loc1) of nonvolatile memory storage device 68 and write 110 "Data Portion #1" to location #1 (i.e., Loc1) of in-line memory module 50; read 108 "Data Portion #2" from location #2 (i.e., Loc2) of nonvolatile memory storage device 68 and write 110 "Data Portion #2" to location #1 (i.e., Loc1) of in-line memory module 52; and read 108 "Data Portion #3" from location #3 (i.e., Loc3) of nonvolatile memory storage device 68 and write 110 "Data Portion #3" to location #2 (i.e., Loc2) of in-line memory module 52.

Once the content of e.g., nonvolatile memory storage device 68 is read 108 and written 110 to the appropriate locations within volatile memory 24 included within computing device 12, data preservation device 10 may reset the above-described indicator (e.g., the status bit) included within data preservation device 10 to indicate that e.g. a power restore event has occurred and that the data included within data preservation device 10 has be restored within volatile memory 24.

While data preservation device 10 is described above as powering two in-line memory modules, this is for illustrative purposes only and is not intended to be a limitation of this disclosure. Specifically, the number of in-line memory modules may be increased or decreased in accordance with e.g., design criteria and system need.

A number of implementations have been described. Nevertheless, it will be understood that various modifications may be made. Accordingly, other implementations are within the scope of the following claims.

What is claimed is:
1. A data preservation device comprising:
a circuit board configured to releasably engage a memory bus of a computing device;
a non-volatile memory storage device electrically coupled to the circuit board;
a control circuit electrically coupled to the circuit board and configured to read a data portion from the computing device and write the data portion to the non-volatile memory storage device during the occurrence of a power failure event on the computing device;
an independent power supply coupled to, and included within the data preservation device and configured to power the data preservation device and at least one of a microprocessor, a memory controller, an IO controller, a cache memory, and a memory module of the computing device during the power failure event; and wherein the data preservation device is configured to be positioned within a memory module slot of the computing device;

wherein the data preservation device adheres to one or more memory module standards promulgated by the JEDEC Solid State Technology Association;

wherein the content of the cache memory within the computing device is first copied to one or more volatile memory devices within the computing device before being copied to the non-volatile memory storage device upon receiving an indication of the power failure; and wherein pointers used to indicate a location of the content of the cache memory within the computing device are stored in the non-volatile memory storage device.

2. The data preservation device of claim 1 wherein the non-volatile memory storage device is chosen from the group consisting of:

an electrically-erasable programmable read-only memory (EEPROM); and an erasable programmable read-only memory (EPROM).

3. The data preservation device of claim 1 wherein the independent power supply includes one or more batteries.

4. The data preservation device of claim 1 wherein the control circuit is further configured to read the data portion from the non-volatile memory storage device and write the data portion to the computing device during the occurrence of a power restore event on the computing device using the pointers stored in the non-volatile memory storage device.

5. The data preservation device of claim 4 wherein the control circuit is further configured to write the data portion to the one or more volatile memory devices within the computing device.

6. The data preservation device of claim 1 wherein the control circuit includes:

a field programmable gate array (FPGA).

7. The data preservation device of claim 1 wherein the computing device includes one or more in-line memory modules and wherein the control circuit is configured to read the data portion from the one or more in-line memory modules of the computing device.

8. The data preservation device of claim 7 wherein the one or more in-line memory modules includes one or more dual in-line memory modules.

9. A computer program product residing on a non-transitory computer readable medium having a plurality of instructions stored thereon which, when executed by a processor, cause the processor to perform operations comprising:

receiving an indication of a power failure event on a computing device;

reading a data portion from the computing device; and writing the data portion to a non-volatile memory storage device included within a data preservation device including a control circuit and an independent power supply, the independent power supply coupled to, and included within the data preservation device and configured to power the data preservation device and at least one of a microprocessor, a memory controller, an IO controller, a cache memory, and a memory module of the computing device, wherein the data preservation device is configured to be positioned within a memory module slot of the computing device and releasably engage a memory bus of the computing device;

wherein the data preservation device adheres to one or more memory module standards promulgated by the JEDEC Solid State Technology Association;

wherein the content of the cache memory within the computing device is first copied to one or more volatile memory devices within the computing device before being copied to the non-volatile memory storage device upon receiving an indication of the power failure; and wherein pointers used to indicate a location of the content of the cache memory within the computing device are stored in the non-volatile memory storage device.

10. The computer program product of claim 9 wherein the non-volatile memory storage device is chosen from the group consisting of:

an electrically-erasable programmable read-only memory (EEPROM); and an erasable programmable read-only memory (EPROM).

11. The computer program product of claim 9 further comprising instructions for:

receiving an indication of a power restore event on the computing device;

reading the data portion from the non-volatile memory storage device; and writing the data portion to the computing device using the pointers stored in the non-volatile memory storage device.

12. The computer program product of claim 11 wherein writing the data portion to the computing device includes writing the data portion to the one or more volatile memory devices within the computing device.

13. The computer program product of claim 9 wherein the computing device includes one or more in-line memory modules and wherein the instructions for reading a data portion from the computing device include instructions for:

reading the data portion from the one or more in-line memory modules of the computing device.

14. The computer program product of claim 13 wherein the one or more in-line memory modules includes one or more dual in-line memory modules.

15. A method comprising:

receiving an indication of a power failure event on a computing device;

reading a data portion from the computing device; and writing the data portion to a non-volatile memory storage device included within a data preservation device including a control circuit and an independent power supply, the independent power supply coupled to, and included within the data preservation device and configured to power the data preservation device and at least one of a microprocessor, a memory controller, an IO controller, a cache memory, and a memory module of the computing device, wherein the data preservation device is configured to be positioned within a memory module slot of the computing device and releasably engage a memory bus of the computing device;

wherein the data preservation device adheres to one or more memory module standards promulgated by the JEDEC Solid State Technology Association;

wherein the content of the cache memory within the computing device is first copied to one or more volatile memory devices within the computing device before being copied to the non-volatile memory storage device upon receiving an indication of the power failure; and wherein pointers used to indicate a location of the content of the cache memory within the computing device are stored in the non-volatile memory storage device.

16. The method of claim 15 wherein the non-volatile memory storage device is chosen from the group consisting of:

an electrically-erasable programmable read-only memory (EEPROM); and an erasable programmable read-only memory (EPROM).

17. The method of claim 15 further comprising:

receiving an indication of a power restore event on the computing device;

reading the data portion from the non-volatile memory storage device; and writing the data portion to the computing device using the pointers stored in the non-volatile memory storage device.

18. The method of claim 17 further comprising writing the data portion to the one or more volatile memory devices within the computing device.

19. The method of claim 15 wherein the computing device includes one or more in-line memory modules and wherein reading a data portion from the computing device includes:

reading the data portion from the one or more in-line memory modules of the computing device.

20. The method of claim 19 wherein the one or more in-line memory modules includes one or more dual in-line memory modules.

* * * * *